United States Patent [19]
Miller et al.

[11] Patent Number: 6,026,536
[45] Date of Patent: Feb. 22, 2000

[54] RANGE LIMITING DUAL DIRECTION SLIP CLUTCH

[75] Inventors: Robin Mihekun Miller, Ellington, Conn.; Petre Dan, Beverly Hills, Mich.

[73] Assignee: Lear Automotive Dearborn, Inc, Southfield, Mich.

[21] Appl. No.: 08/947,978

[22] Filed: Oct. 9, 1997

[51] Int. Cl.[7] ....................................................... A47L 1/00
[52] U.S. Cl. ................................... 15/250.31; 15/250.13; 15/250.3; 15/250.34; 192/56.1
[58] Field of Search ............................. 15/250.3, 250.34, 15/250.13, 250.19, 250.16, 250.21, 250.31; 74/411; 192/56.1, 56.6; 464/39

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,600,622 | 6/1952 | Dahlgren ............................. 15/250.16 |
| 2,615,945 | 10/1952 | Jaeschke . |
| 2,659,237 | 11/1953 | Wood . |
| 2,744,282 | 5/1956 | Dyer et al. ............................. 15/250.3 |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,574,882 | 4/1971 | Petry . |
| 3,619,676 | 11/1971 | Kawakami . |

(List continued on next page.)

FOREIGN PATENT DOCUMENTS

| | | |
|---|---|---|
| 0 345 002 A2 | 6/1989 | European Pat. Off. . |
| 1.281.424 | 12/1961 | France . |
| 701634 | 12/1940 | Germany . |
| 822 178 | 11/1951 | Germany . |
| 25 29 702 | 1/1977 | Germany . |

(List continued on next page.)

OTHER PUBLICATIONS

Patent Abstracts of Japan, vol. 016, 7–438 (M–1309), Sep. 11, 1992 for JP Patent Publication No. 04151351.

Page 100, *Machine Design*, 60 Oct. 13, 1988 No. 24, Cleveland, Ohio US.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

(List continued on next page.)

*Primary Examiner*—Robert J. Warden, Sr.
*Assistant Examiner*—Kaj K. Olsen
*Attorney, Agent, or Firm*—MacMillan, Sobanski & Todd, LLC

[57] ABSTRACT

In an automotive vehicle, a dual directional slip clutch couples a windshield wiper arm to an electric motor and is operable to disengage the wiper arm from the drive motor during certain conditions. A range limiting system works in conjunction with the dual directional slip clutch and limits the degree of rotation of the windshield wiper arm. If the wiper arm becomes obstructed, the slip clutch will release the wiper arm from the motor thus preventing the motor from stalling ensures or damage to the system that is driving the wiper. The range limiting system ensures the correct alignment engagement when the wiper arm becomes un-obstructed. A single-direction slip clutch mechanism is provided for those instances where it is desirable to disengage the wiper arm from the motor when the arm is traveling in one direction.

6 Claims, 5 Drawing Sheets

U.S. PATENT DOCUMENTS

| | | |
|---|---|---|
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,144,614 | 3/1979 | Barbee ................................. 15/250.3 |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,637,091 | 1/1987 | Wu . |
| 4,639,065 | 1/1987 | Kohler et al. . |
| 4,660,698 | 4/1987 | Miura . |
| 4,674,781 | 6/1987 | Reece et al. . |
| 4,701,972 | 10/1987 | Saito . |
| 4,702,117 | 10/1987 | Tsutumi et al. . |
| 4,724,760 | 2/1988 | Bubley . |
| 4,733,147 | 3/1988 | Muller et al. . |
| 4,793,640 | 12/1988 | Stewart, Sr. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,201,679 | 4/1993 | Velte, Jr. et al. .................. 440/49 |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,370,028 | 12/1994 | Maue et al. . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,570,923 | 11/1996 | Taylor ................................. 296/164 |
| 5,613,268 | 3/1997 | Scorsiroli ........................ 15/250.352 |
| 5,691,586 | 11/1997 | Yonnet et al. . |
| 5,694,812 | 12/1997 | Maue et al. . |
| 5,844,382 | 12/1998 | Dan . |

FOREIGN PATENT DOCUMENTS

| | | |
|---|---|---|
| 27 27 454 | 12/1978 | Germany . |
| 28 16 207 A1 | 10/1979 | Germany . |
| 28 30 772 | 1/1980 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| 406639 | 5/1932 | United Kingdom . |
| 530287 | 12/1940 | United Kingdom . |
| 583422 | 12/1946 | United Kingdom . |
| 743720 | 3/1953 | United Kingdom . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |
| WO 96/41087 | 12/1996 | WIPO . |

OTHER PUBLICATIONS

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–147.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb. 1996, H. Winston Maue, pp. 73–76.

International Search Report for PCT/US98/15376, 4 pages, priority dated Oct. 1997.

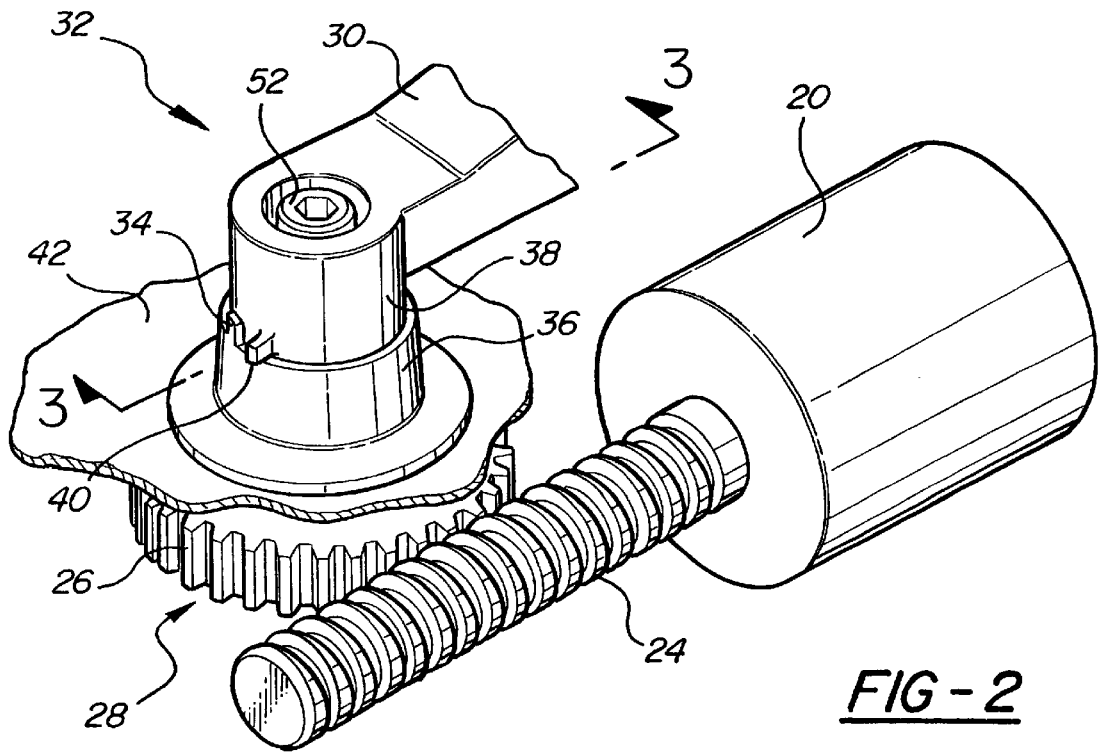
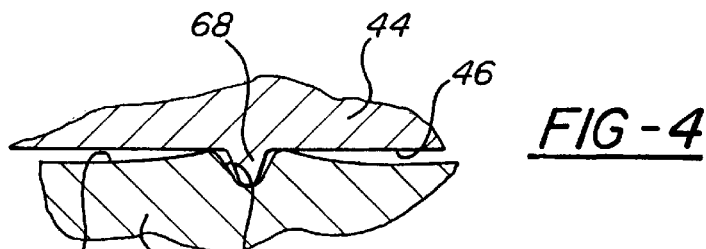
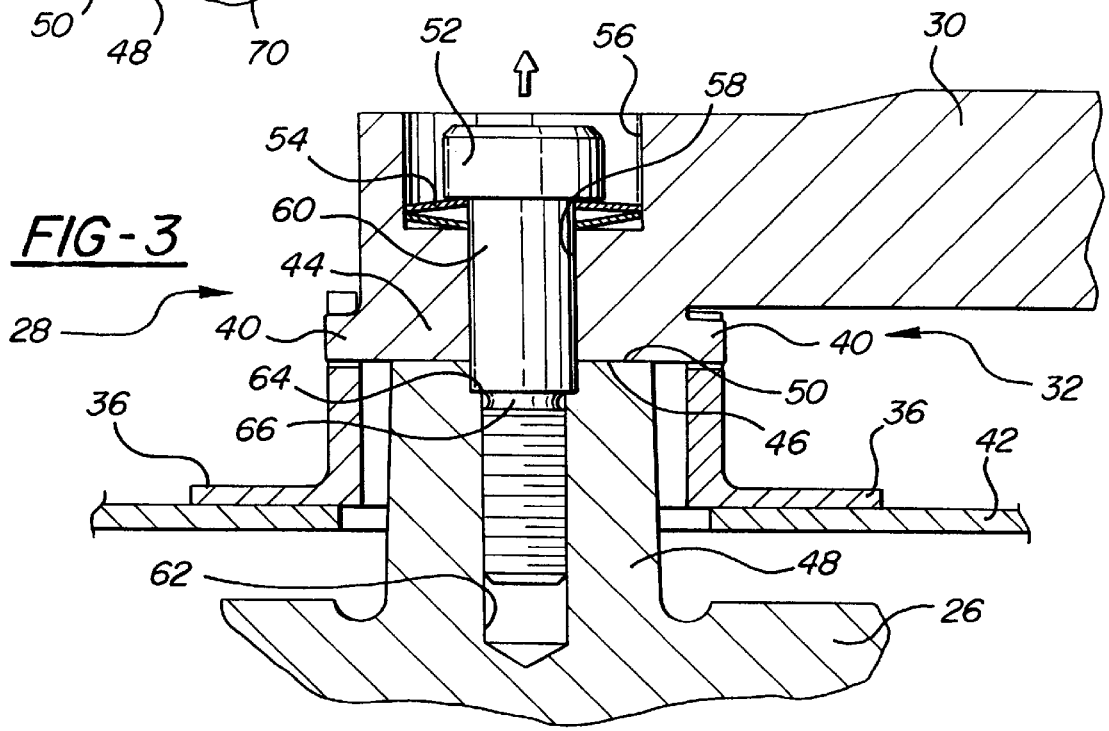

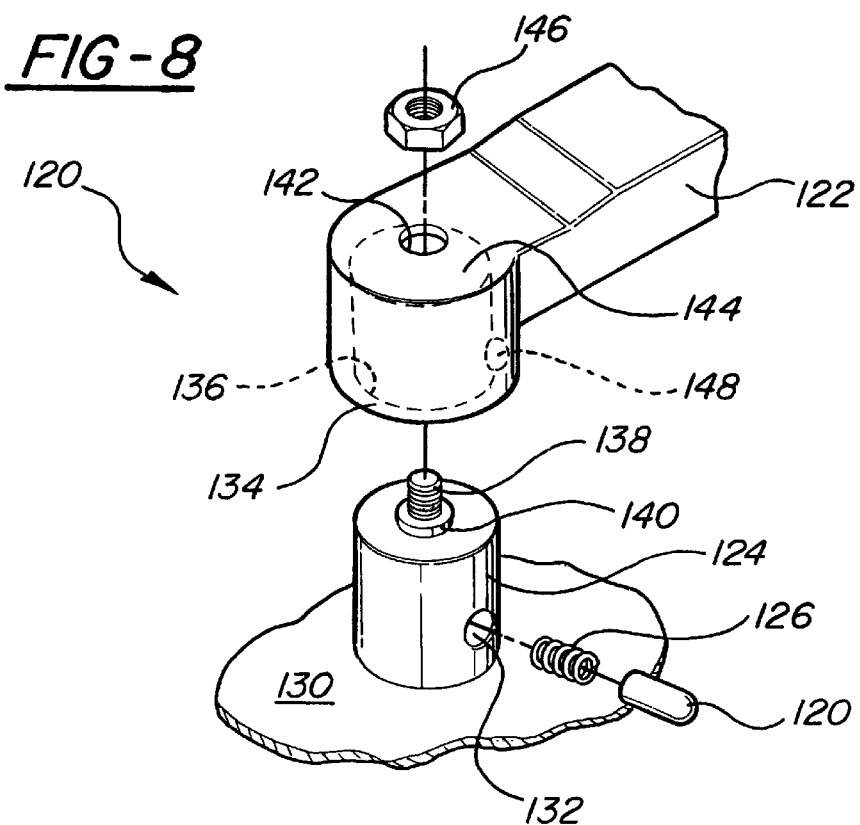
FIG-8
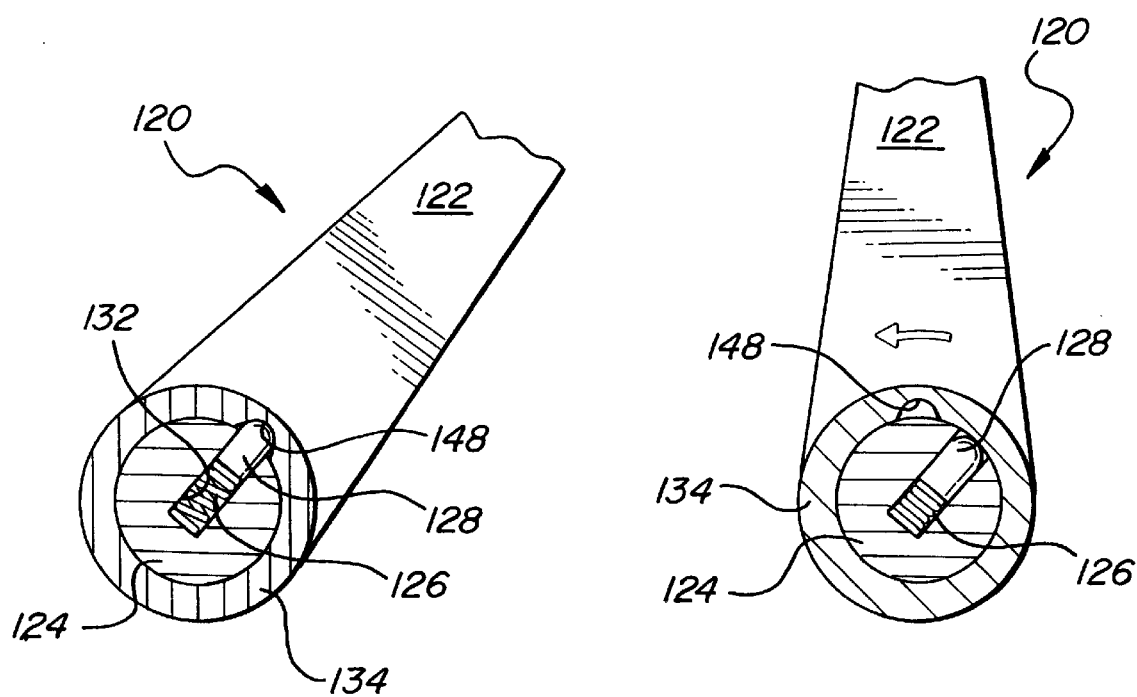
FIG-9
FIG-10

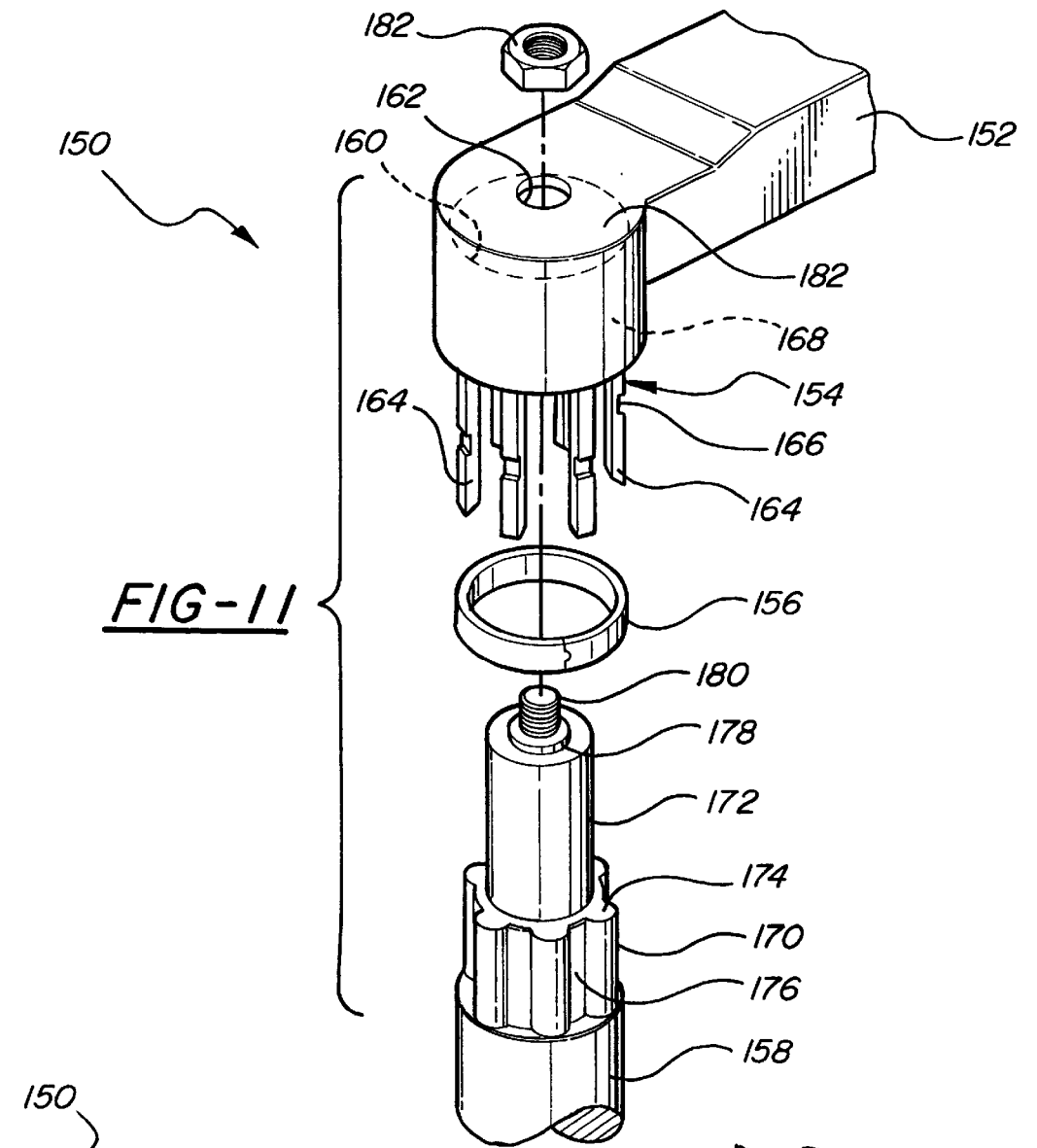
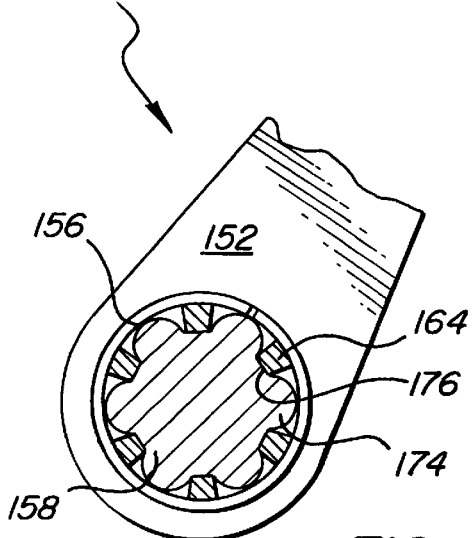
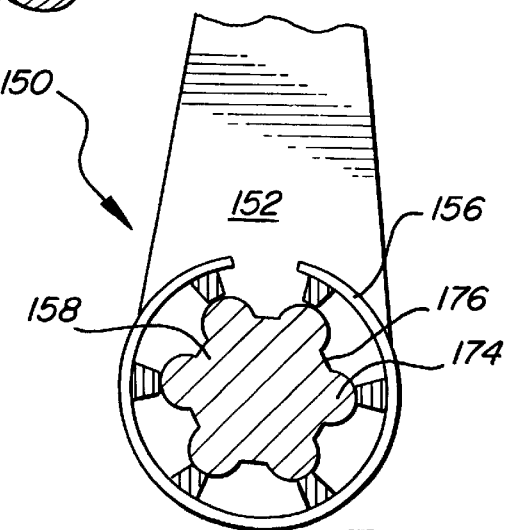
FIG-11
FIG-12
FIG-13

RANGE LIMITING DUAL DIRECTION SLIP CLUTCH

BACKGROUND OF THE INVENTION

This invention relates generally to a clutch mechanism and specifically to a range limiting dual direction slip clutch for use with an automotive vehicle windshield wiper assembly.

It is customary for automotive vehicles to have one or more windshield wiper assemblies. Conventional assemblies include rubber wiper blades mounted upon claw brackets that are pivotally attached to wiper arms mounted upon a rotating shaft. A variety of methods have been utilized to activate the rotating shafts including using an electric motor which actuates a series or parallel-coupled four-bar linkage mechanism.

Utility vehicles and minivans often employ a window wiper assembly for cleaning the rear window. Typically, these types of rear window wiper assemblies include a wiper blade mounted upon a bracket which is coupled to a wiper arm. The wiper arm is attached to a wiper shaft rotatably driven in a cyclicle oscillating manner by a helical gear. A reversible, fractional horsepower, directional current electric motor serves to actuate the helical gear through an armature shaft-mounted worm gear enmeshed therewith. An example of this type of rear window wiper arrangement is disclosed in U.S. Pat. No. 5,519,258 entitled "System and Method for Controlling Vehicle Liftgate Window Wiper".

It is also well known in minivans, station wagons, and sport-utility vehicles to employ a rear window release lock or latch that is actuated by a solenoid. The latch can be unlocked to allow for upward pivotal movement of the rear window in relation to the otherwise stationary liftgate. A separate liftgate lock can be mounted upon the liftgate door for fastening the liftgate to the body of the vehicle thereby preventing inadvertent opening of the liftgate. This liftgate lock is traditionally operated by manual key or handle rotation, or more recently through a separate electric motor or solenoid. It is also well known to provide a separate electric motor to operate a pump for providing fluid under pressure to the rear window for cleaning the same.

Separate motors or solenoids are commonly required to actuate the aforementioned locks, the wiper, and fluid pump. However, having multiple motors has increased vehicle weight and cost while further proving difficult to package within the often small spaces provided. This because the window wiper mechanism, rear window lock and liftgate lock and windshield wiper pump, as well as their motors, are all incorporated within the pivoting liftgate.

To overcome the aforementioned problems, a single electromagnetic device has been provided that selectively operates an intermittent motion mechanism coupled to a window wiper, a door lock, a window release lock, and the like. An example of such improvements can be found in WO 96/33891 entitled "Multi-Functional Apparatus Employing an Intermittent Motion Mechanism", WO 96/33892 entitled "Control System for an Automotive Vehicle Multi-Functional Apparatus", and WO 96/33893 entitled "Multi-Functional Apparatus Employing an Electromagnetic Device". These devices generally employ a geneva or starwheel-type mechanical construction for imparting rotational movement to an output pinion. WO 96/33891 specifically teaches an electric motor driving a main gear having a plurality of output devices connected thereto. Each such output device can be selectively activated depending upon whether the driver desires to activate the windshield wipers, liftgate release/lock mechanism, rear window release lock mechanism, or the like.

The aforementioned systems employ a direct connection from the output pinion to the windshield wiper arm. During inclement weather conditions, the wiper arm can become stuck, for example, when ice builds up on the windshield, thus causing the wiper arm to stop. Also, if a person were to grab the wiper during operation, the motor would be directly impeded. With conventional wiper mechanism designs, these conditions could stall the drive motor strip components, including gears, bend, or even break the wiper arm. If the arm stops, a driver would be prevented from utilizing the liftgate release lock mechanism or the rear window release lock mechanism until the windshield wiper becomes unstuck. Thus, it is desirable to disengage the wiper arm from the electric motor during certain conditions in order to allow other features to be utilized in the vehicle that are propelled by a common electric motor.

SUMMARY OF THE INVENTION

Accordingly, it is an object of the present invention to provide either a single or a multi-directional slip clutch coupled between the windshield wiper arm and the electric motor driving the windshield wiper. The slip clutch can be activated in either a clockwise direction or counter clockwise direction depending upon the performance desired. A windshield wiper range limiting system works in conjunction with the slip clutch to limit the travel of the windshield wiper blade on the windshield.

In accordance with one aspect of the invention, a multi-functional apparatus driven by a motor is comprised of a drive gear connected to a motor which extends into a housing. A driven gear meshes with the drive gear and has a first cam surface. A windshield arm is rotatably connected to the driven gear and the wiper arm has a second cam surface that is operable to engage the first cam surface of the driven gear. A biasing member urges the cam surface together to ensure engagement therebetween unless the wiper arm becomes obstructed. A connecting member connects the driven gear and wiper arm together to hold the system together.

Additional advantages and features of the present invention will become apparent from the following description and appended claims, taken in conjunction with the accompanying drawings.

BRIEF DESCRIPTION OF THE DRAWINGS

FIG. 2 is a partially fragmented perspective view of a generic range limiting system that can be employed with the various slip clutch assemblies of the present invention;

FIG. 3 is a sectional view taken from line 3—3 of FIG. 2, illustrating a first preferred embodiment of the present invention wherein a belleville washer is used;

FIG. 4 is a fragmented side elevational view of the FIG. 3 embodiment, illustrating the surfaces of the clutch mechanism;

FIG. 8 is an exploded perspective view of a fourth preferred embodiment of the present invention, illustrating a spring pin dual direction slip clutch;

FIG. 9 is a top view of the spring pin dual direction slip clutch in the engaged position;

FIG. 10 is a top view of the spring pin dual direction slip clutch in the slipped position;

FIG. 11 is an exploded assembly view of a fifth preferred embodiment of the present invention, illustrating a splined pinion and finger clutch;

FIG. 12 is a top view of the fifth preferred embodiment shown in the engaged position;

FIG. 13 is a top view of the fifth preferred embodiment shown during a slipped condition.

DETAILED DESCRIPTION OF THE PREFERRED EMBODIMENT

Figure 1:
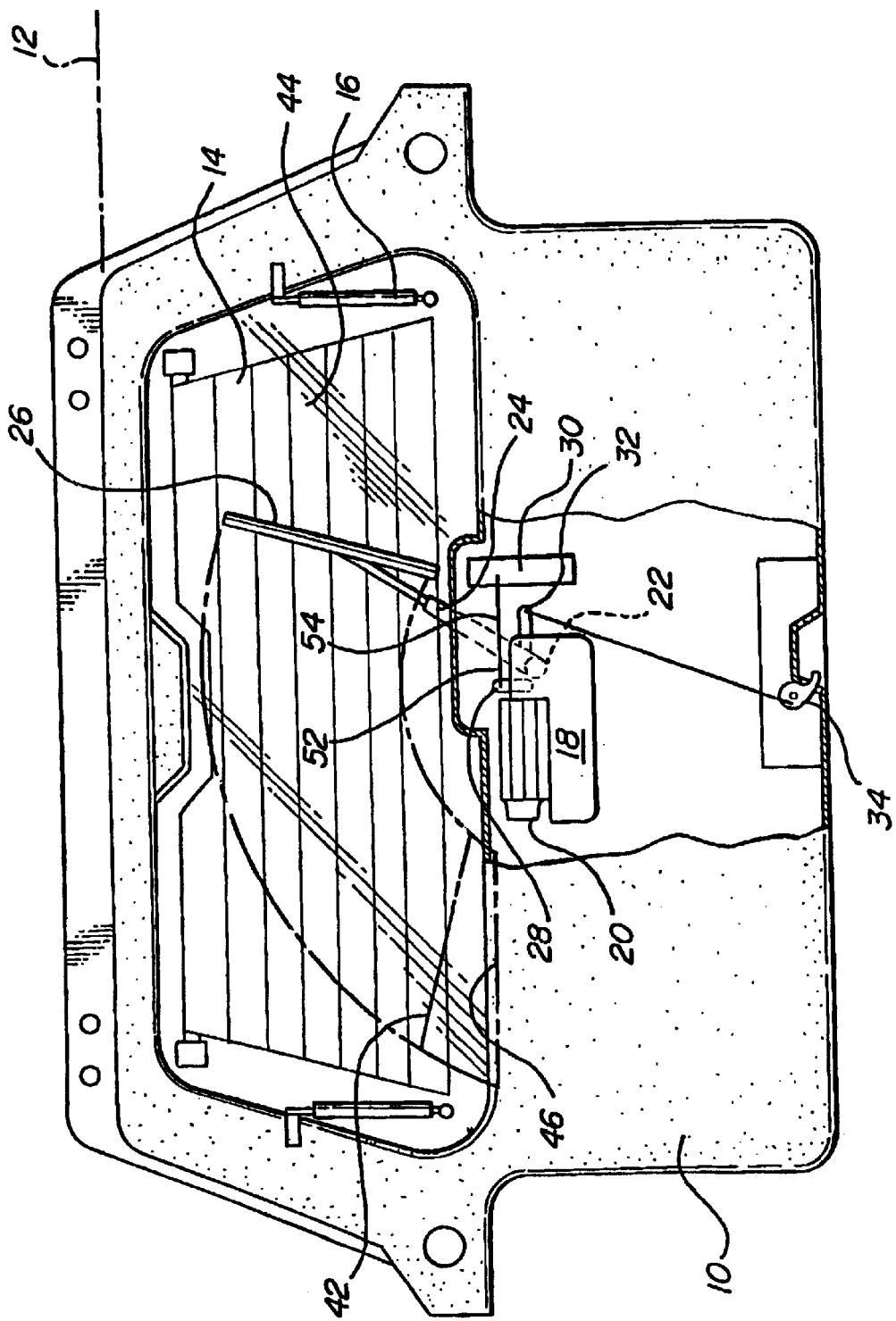
FIG. 1 is a front elevational view of a tailgate of a vehicle from the perspective of a passenger sitting in the vehicle looking out, showing various components connected to a multi-functional apparatus that is coupled to the slip clutch.

With reference to FIG. 1, an automotive vehicle, such as a minivan, sport-utility vehicle, or the like, is illustrated having a rear liftgate door 10 which can pivot about a generally horizontal, hinging pivot axis 12. When the liftgate is pivoted to an open position a cargo space or passenger compartment is accessible from behind the vehicle. Pivotally connected to liftgate 10 is a pop-up window 14 and a pair of pneumatic cylinders 16 serve to push the window 14 toward the open position when a lower portion of window 14 is released.

With reference to FIGS. 1 and 2, a preferred embodiment of the present invention includes a multi-functional apparatus 18 that is secured to the inside surface of liftgate 10 and is normally hidden by a trim panel that is shown broken away for illustrative purposes. The multi-functional apparatus 18 is a transmission-like device consisting of a plurality of output drive members driven by an electric motor 20. In the present invention, the multi-functional apparatus 18 has at least three outputs, each of which are driven by their own intermittent motion mechanism. It will be appreciated that the slip clutch of the present invention could be coupled directly to a motor without any intervening gears or other mechanisms.

Multi-functional apparatus 18 includes a first intermittent mechanism 22 for oscillating the wiper blade 19 from a first position 21 to a second position 21'. Wiper blade 19 rests in a park position 21" which allows window 14 to pop up. A second intermittent motion mechanism couples a window lock mechanism to a drive motor 20. This allows the operator to selectively release window 14. A third intermittent motion mechanism 25 couples a liftgate lock mechanism to electric motor 20. This allows the operator to selectively lock and unlock liftgate 10 as desired. The present invention focuses on improving the operation of the windshield wiper by utilizing a clutch and range limiter, and therefore, no further discussion will be presented to the second intermittent mechanism 23 and the third intermittent mechanism 25.

Turning now to the range-limiting dual direction slip clutch for a wiper mechanism, a first intermittent motion mechanism 22 is driven by a helical gear 24 connected to motor 20 which in turn drives a gear 26 with a pinion. The driven gear 26 is coupled by means of a clutch assembly 28 to a wiper arm mechanism 30. A wiper arm range limiting system 32 is a unique system that is adaptable to all of the embodiments disclosed herein, but is only disclosed in FIGS. 2 and 3 for discussion purposes. Thus, it will be appreciated that the range limiting system 32 can work in conjunction with every embodiment disclosed herein.

With reference to FIGS. 2–4, the range limiting system 32 is disclosed and performs the function of ensuring correct alignment between the wiper arm and the driven gear 26 when the wiper arm is no longer obstructed. Misalignment could occur, for example, when the wiper arm advances, becomes disengaged from the motor, but then becomes re-engaged partially during a cycle. During such an occasion, the wiper would rotate until it hits a stop, the clutch disengages allowing the motor to continue to advance, but then re-engages the clutch at an original location causing the wiper arm to continue rotating.

The range limiting system 32 includes a stop 34 that can be formed as part of a trim piece 36. One or more stops 34 can be provided along the periphery of trim piece 36 which together define a window 38 for a limit pin 40 to traverse. The present invention contemplates an approximate 120 to 150 degree range for wiper arm 30 to travel. It will be appreciated that the wiper range can be modified by changing the location of stops 34. Trim piece 36 can be a separate component or an integral part of the multi-functional apparatus housing 42 which, in turn, conceals the components of multi-functional apparatus 18.

With reference to FIG. 3, clutch assembly 28 is comprised of a wiper arm 30 having a downturned annular portion 44 with an upper cam surface 46, and a driven gear member 26 having an upward telescoping portion 48 with a corresponding cam surface 50. Clutch assembly 28 further includes bolt 52 and belleville washer 54. First bore 56 is provided within wiper arm 30 and a second bore 58 extends from the first bore for receiving an elongated cylindrical portion 60 of the bolt. The upward telescoping portion 48 of gear 26 includes threaded bore 62 and shoulder 64. Shoulder 64 provides a stop for end 66 of bolt 52 to rest against. This enhances assembly of clutch 28 as well as repeatability of the desired performance. When bolt 52 is properly seated against shoulder 64, as shown in FIG. 3, belleville washer 54 is compressed a predetermined amount that is proportional to the amount of break-away torque required to separate wiper arm 30 from drive gear 26. It will be appreciated that belleville washer 54 can be made of various materials and can be shaped differently in order to acquire the desired break-away torque setting.

FIG. 4 illustrates one possible configuration of the cam surfaces of the dual direction clutch 28. Upper cam surface 46 includes a protrusion 68 extending substantially the diameter of annular portion 44 and mates with a corresponding groove 70 located in the lower cam surface 50. Gear 26 is preferably made of a low friction material, for example, a glass filled plastic, in order to enhance wearability and reduce friction. It will be appreciated that wiper arm 30, and its corresponding wiper cam surface 46, be made of metal or of some other material in order to obtain the desired performance. Moreover, telescoping portion 48 could be a component separate from gear 26 and they could be fixed together by conventional methods.

In operation, driven gear 26 rotates wiper arm 30 continuously within the limits defined by the range limit system 32. This continues until either the operator turns off electric motor 20 or wiper arm 30 is obstructed. This could occur when the wiper arm is stopped by ice on the windshield or some other obstruction, such as someone grabbing wiper arm 30. When this occurs, under certain circumstances, it is desirable to continue operating drive motor 20 and any of the other apparatuses the drive motor may be propelling, for example, the liftgate lock or the window release lock. Thus, to not impede motor 20, clutch assembly 28 activates thus disengaging wiper arm 30 from gear mechanism 26. This is accomplished when a predetermined level of torque is applied to wiper arm 30 that is sufficient to overcome washer 54. When this occurs, wiper arm 30 shifts upward and allows protrusion 68 to slide out of groove 70. This is called the "slipped" position which temporarily disengages wiper arm 30 from the gear 26 even though gear 26 continues to oscillate. When the wiper arm is no longer obstructed, washer 54 will bias protrusion 68 downward into groove 70 at the next available cycle thus recoupling wiper arm 30 to the motor 20.

Figure 5:
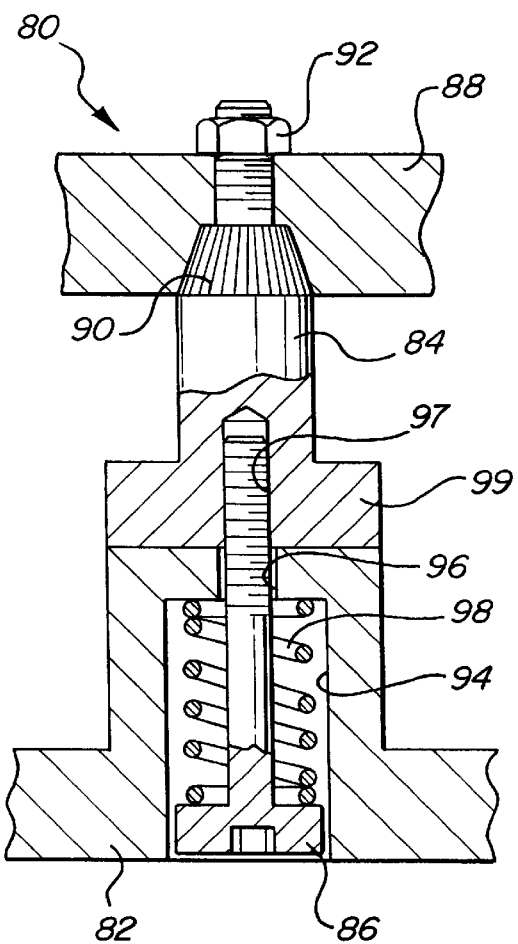
FIG. 5 is a fragmented side elevational view of a second preferred embodiment of the present invention, illustrating a clutch mechanism wherein a coil spring is used.
Figure 6:
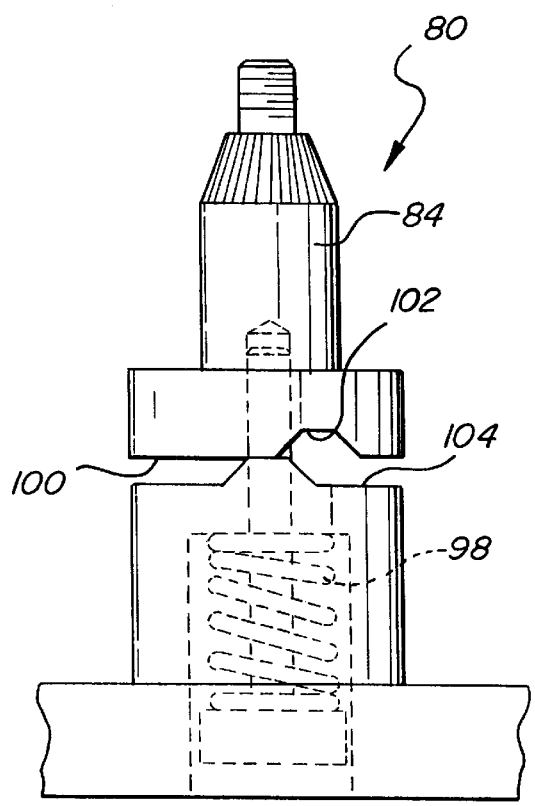
FIG. 6 is a simplified side elevational view illustrating a dual direction slip clutch advanced to the slip position.

With reference to FIGS. 5 and 6, a second preferred form of the present invention is a spring coil dual clutch assembly comprised of a drive member 82, a driven member 84, and an inverted screw 86. Wiper arm 88 is secured to a splined end 90 by means of a nut 92. The drive member has a first cylindrical bore 94 and a through hole 96 that receives inverted screw 86. The threaded end of screw 86 is fastened to threaded bore 97 in an annular portion 99 of the driven member 84. Coil spring 98 is compressed by the inverted screw 86 and provides the biasing force for maintaining engagement of driven member 84 and drive member 82.

FIG. 6 illustrates driven member 84 disengaged from drive member 82 thus disengaging wiper arm 88 from motor 20. Upper cam surface 100 of driven member 84 has a frustrum-shaped recess 102 that disengages a correspondingly-shaped lower cam surface 104. The drive member 82 will continue to rotate even though wiper arm 88 is stuck. When the wiper arm is no longer stuck, spring 98 will bias upper cam surface 100 towards lower cam surface 104 to recouple wiper arm 88 to motor 20. The wiper 88 will begin oscillating again.

Figure 7:
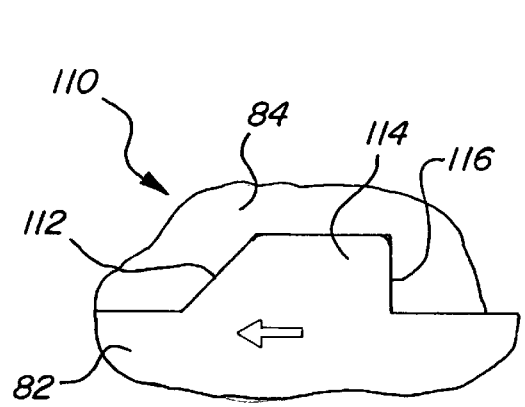
FIG. 7 is a fragmented side elevational view, of a third preferred embodiment of the present invention illustrating the profile of a cam surface for a single direction slip clutch.

FIG. 7 illustrates a third preferred form of the present invention which is a slight modification of the second embodiment disclosed in FIGS. 5 and 6. The primary modification pertains to the configuration of the cam surface. Thus, clutch assembly 110 includes a single direction clutch assembly wherein a single ramp 112 only allows disengagement of wiper arm 88 in one direction. To reengage the wiper arm to the motor, drive gear 82 reverses direction causing protrusion 114 to rest upon meeting a stop 116. The remaining components of assembly 110 are the same as disclosed in the second embodiment, and no further discussion will be presented here.

FIG. 8 illustrates a fourth preferred embodiment of the present invention and includes a dual direction slip clutch assembly 120 comprising wiper arm 122, shaft 124, and spring 126 that biases pin 128. Shaft 124 preferably has a smooth exterior profile, is cylindrically shaped, and is connected to drive member 130 which in turn is coupled to a motor (not shown). Shaft 124 has a transversely extending bore 132 that is operable to receive spring 126 in pin 128. A threaded stud 138 extends axially from the top surface of shaft 124 and receives spacer 140. The thickness of spacer 140 is slightly greater than the thickness of arm 122 and further, the diameter of spacer 140 is smaller than the diameter of clearance hole 142. This allows spacer 140 to extend slightly above a top surface 144 of arm 122 when nut 146 is secured to stud 138. When assembled, the end of pin 128 is received within a detent 148. Detent 148 is preferably arcuate shaped and slightly larger than the end profile of pin 128.

FIG. 9 illustrates clutch assembly 120 in its engaged position wherein wiper arm 122 is coupled to drive motor 20. Arm 122 will continue to oscillate as long as pin 128 maintains engagement with detent 148. When a torsional force reaches a predetermined amount sufficient to overcome spring 126, pin 128 compresses the spring until the end of pin 128 climbs out of detent 148 as the arm rotates counter clockwise or clockwise. Clutch 120 has now disengaged arm 122 from motor 20 thus allowing shaft 124 to continue rotating. Pin 128 will re-engage detent 148 during the next cycle if arm 122 is no longer stuck or otherwise immobile. It will be appreciated that spring 126 can have a variety of resilient properties depending upon the amount of break-over force desired. Moreover, detent 148 and pin 128 can be physically configured to have different geometry depending upon the desired performance of clutch 120. The components in clutch assembly 120 can be made of a variety of materials including plastic and metal.

With respect to FIGS. 11–13, a fifth preferred embodiment is disclosed illustrating a bi-directional clutch assembly 150 comprising wiper arm 152, finger assembly 154, spring clip 156, and contoured drive member 158. Wiper arm 152 is preferably made of metal and has a downwardly extending portion with an internal bore 160 and a clearance hole 162. Finger assembly 154 is comprised of a plurality of radially-spaced resilient fingers 164, each having a recess 166 for receiving spring clip 156. Spring clip 156 is a split clip and fits within recess 166. This prevents spring clip 156 from moving axially once installed.

Sleeve 168 is slidably received within bore 160 and defines the distal end of each finger 164. Thus, sleeve 168 and finger 164 can be a one-piece insert that is secured by conventional methods to arm 152. It will be appreciated that fingers 164 could be a part molded with, or cast to, arm 152 thus creating a one-piece arm and finger mechanism.

Drive member 158 has a splined section 170 and a smooth cylinder section 172. The splined section is comprised of a plurality of outwardly extending lobes 174 that are smooth and arcuate shaped surrounded by grooves 176. The profile of the lobes can be modified to vary the performance of clutch assembly 150. The upper end of elongated cylinder 172 has a spacer 178 and a threaded stud 180. The spacer can be an integral part of cylinder 172 or it can be a separate component. The diameter of spacer 178 is smaller than the diameter of hole 162 and the thickness of spacer 178 is greater than the thickness of arm 152 and hole 162. When assembled, nut 182 bottoms out on spacer 178 while leaving a clearance in between the underside of nut 182 and top surface 182 of arm 152. This provides axial displacement and helps drive member 158 to rotate relative to arm 152 when clutch 150 is slipping.

FIG. 12 illustrates clutch assembly 150 is an engaged position where arm 152 is coupled to motor 20 wherein spring clip 156 is fully contracted thus causing fingers 164 to rest within grooves 176. Drive member 158 and wiper arm 152 are now oscillating proportionally to one another and will continue to do so until either motor 20 is turned off or arm 152 is subjected to a stuck condition.

With reference to FIG. 13, when the torque on arm 152 exceeds a predetermined amount, spring clip 156 expands outward thus disengaging arm 152 from motor 20. This occurs when fingers 164 ride up on lobes 174 and arm 152 rotates such that fingers 164 nest with the adjacent groove 176. This racheting effect will continue until the torque on arm 152 no longer overcomes spring clip 156. When this occurs, resilient spring clip 156 will collapse or close, thus causing fingers 152 to nest within grooves 176.

Figure 14:
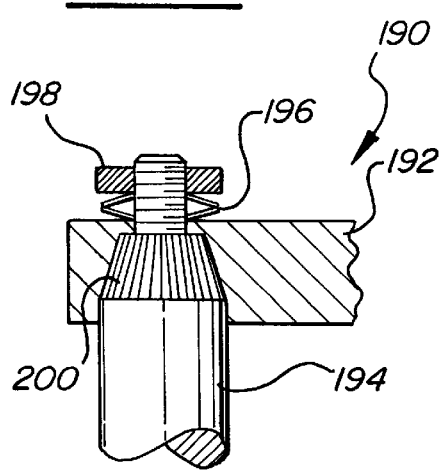
FIG. 14 is a sixth preferred embodiment of the present invention, illustrating a belleville washer biasing a wiper arm against a splined shaft.

FIG. 14 represents a sixth preferred embodiment wherein a dual direction clutch assembly 190 includes a wiper arm 192, a drive member 194, a belleville washer 196, and nut 198 for retaining the assembly together. Splines 200 are provided on one end of drive member 194 which mate with corresponding splines in an internal cavity of arm 192. The configuration of splines 200 can be varied depending upon the desired break-away characteristic. In operation, wiper arm 192 is coupled to motor 20 as long as drive member 194 maintains engagement with arm 192. If arm 192 becomes stuck, for example, a person grabs the arm or ice builds up on the windshield of the vehicle sufficient to stop the arm, a torsional force is transmitted to drive member 194. An axial component of this torsional force is transferred to the washer 196 causing the washer to compress as the arm 192 disengages drive member 194. It will be appreciated that the performance of clutch 190 can be modified by varying the characteristics of washer 196. When force is applied to arm 192 that will no longer overcome washer 196, washer 196 forces arm 192 back into engagement with drive member 194. Arm 192 is now coupled to motor 20 allowing the arm to oscillate.

Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus comprising:

a motor;

a housing;

a drive gear connected to the motor and being at least partially located in the housing;

a driven gear meshed with the drive gear;

a first cam surface rotatably mounted in a coaxial manner with the driven gear;

a window wiper assembly;

a second cam surface mounted to the wiper assembly and being operable to disengagably interface with the first cam surface;

a biasing member urging the cam surfaces together; and a connecting member having an enlarged head and a threaded end, the connecting member fastening the driven gear to the wiper assembly.

2. The apparatus as claimed in claim 1, wherein one of the cam surfaces has a sloped protrusion, and the other cam surface has a corresponding groove operable to receive the sloped protrusion.

3. The apparatus as claimed in claim 1, wherein the biasing member is a belleville type washer disposed between the connecting member and the wiper arm.

4. The apparatus as claimed in claim 1, wherein the biasing member is a coil type spring positioned between the connecting member and the driven gear.

5. The apparatus as claimed in claim 1, wherein the driven gear has a bore for receiving a portion of the connecting member.

6. The apparatus as claimed in claim 1, further comprising a wiper range limiting system having a stop member integral with a vehicle component and a limit feature that rotates with the wiper arm, the wiper range limiting system being operable to control the travel of the wiper arm by physically abutting the stop member with the limit feature.

* * * * *